US006261471B1

(12) United States Patent
Tsuda et al.

(10) Patent No.: US 6,261,471 B1
(45) Date of Patent: Jul. 17, 2001

(54) COMPOSITION AND METHOD OF MAKING A FERROFLUID HAVING AN IMPROVED CHEMICAL STABILITY

(76) Inventors: Shiro Tsuda, 906-17 Nishiashiarai, Asahi-shi, Chiba (JP), 289-2515; Yasutake Hirota, 265 Village Cir. Way, #13, Manchester, NH (US) 03102; Hisao Suzuki, 2289-25 Miyakawa, Hikari-machi Sosa-gun, Chiba (JP), 289-1727

( * ) Notice: Subject to any disclaimer, the term of this patent is extended or adjusted under 35 U.S.C. 154(b) by 0 days.

(21) Appl. No.: 09/418,892

(22) Filed: Oct. 15, 1999

(51) Int. Cl.[7] .................... C04B 1/28

(52) U.S. Cl. .................... 252/62.52; 252/62.51 R; 252/62.54

(58) Field of Search .................... 252/62.52, 62.54, 252/62.51 R

(56) References Cited

U.S. PATENT DOCUMENTS

| | | | |
|---|---|---|---|
| 4,554,088 | 11/1985 | Whitehead et al. | 252/62.54 |
| 4,956,113 | 9/1990 | Kanno et al. | 252/62.52 |
| 4,976,883 | 12/1990 | Kanno et al. | 252/62.52 |
| 5,013,471 | 5/1991 | Ogawa | 252/62.52 |
| 5,143,637 | 9/1992 | Yokouchi et al. | 252/62.52 |
| 5,240,628 | 8/1993 | Kanno et al. | 252/62.56 |
| 5,676,877 | 10/1997 | Borduz et al. | 252/62.52 |
| 5,718,833 | 2/1998 | Yamamoto et al. | 252/62.52 |
| 5,741,922 * | 4/1998 | Yoshino | 252/62.55 |

FOREIGN PATENT DOCUMENTS

| | | |
|---|---|---|
| 61-263202A | 11/1986 | (JP) . |
| 63-124402A | 5/1988 | (JP) . |
| 63-131502A | 6/1988 | (JP) . |
| 5-159917 * | 6/1993 | (JP) . |
| 05159917A | 6/1993 | (JP) . |
| 05166619A | 7/1993 | (JP) . |
| 05299231A | 11/1993 | (JP) . |
| 07142227A | 6/1995 | (JP) . |
| 09289110A | 11/1997 | (JP) . |
| 10012426A | 1/1998 | (JP) . |

* cited by examiner

*Primary Examiner*—C. Melissa Koslow
(74) *Attorney, Agent, or Firm*—Robert R. Deleault, Esq.; Mesmer & Deleault, PLLC

(57) ABSTRACT

The invention relates to a composition and a process for producing a magnetic fluid comprising finely divided magnetic particles covered with at least one surfactant. A fluorocarbon-silane surface modifier is employed which is added to cover the free oxidizable exterior surface of the outer layer of the particles to increase the acid resistance of the colloid.

37 Claims, 1 Drawing Sheet

COMPOSITION AND METHOD OF MAKING A FERROFLUID HAVING AN IMPROVED CHEMICAL STABILITY

BACKGROUND OF THE INVENTION

1. Field of the Invention

The present invention relates to magnetic fluids and a process for preparing the same. Particularly, the present invention relates to a magnetic fluid composition having an improved chemical stability and the process for preparing the same. More particularly, the present invention relates to a magnetic fluid composition having an improved chemical stability and the process for preparing the same where a ferrofluid is treated with a fluorocarbon containing surface modifier. Yet more particularly, the present invention relates to a magnetic fluid composition having an improved chemical stability in acidic environments and the process for preparing the same where a ferrofluid is treated with a fluorocarbon silane surface modifier.

2. Description of the Prior Art

Magnetic fluids, sometimes referred to as "ferrofluids" or magnetic colloids, are colloidal dispersions or suspensions of finely divided magnetic or magnetizable particles ranging in size between thirty and one hundred fifty angstroms and dispersed in a carrier liquid. One of the important characteristics of magnetic fluids is their ability to be positioned and held in space by a magnetic field without the need for a container. This unique property of magnetic fluids has led to their use for a variety of applications. One such use is their use as liquid seals with low drag torque where the seals do not generate particles during operation as do conventional seals. These liquid seals are widely used in computer disc drives as exclusion seals to prevent the passage of airborne particles or gases from one side of the seal to the other. In the environmental area, environmental seals are used to prevent fugitive emissions, that is emissions of solids, liquids or gases into the atmosphere, that are harmful or potentially harmful.

Other uses of magnetic fluids are as heat transfer fluids between the voice coils and the magnets of audio speakers, as damping fluids in damping applications and as bearing lubricants in hydrodynamic bearing applications. Yet another is their use as pressure seals in devices having multiple liquid seals or stages such as a vacuum rotary feedthrough seal. Typically, this type of seal is intended to maintain a pressure differential from one side of the seal to the other while permitting a rotating shaft to project into an environment in which a pressure differential exists. Oftentimes, these vacuum rotary feedthrough seals are exposed to reactive gases such as chlorine and fluorine. These types of environments cause the magnetic fluids to deteriorate more rapidly.

The magnetic particles are generally fine particles of ferrite prepared by pulverization, precipitation, vapor deposition or other similar means. From the viewpoint of purity, particle size control and productivity, precipitation is usually the preferred means for preparing the ferrite particles. The majority of industrial applications using magnetic fluids incorporate iron oxides as magnetic particles. The most suitable iron oxides for magnetic fluid applications are ferrites such as magnetite and γ-ferric oxide, which is called maghemite. Ferrites and ferric oxides offer a number of physical and chemical properties to the magnetic fluid, the most important of these being saturation magnetization, viscosity, magnetic stability, and chemical stability of the whole system. To remain in suspension, the ferrite particles require a surfactant coating, also known as a dispersant to those skilled in the art, in order to prevent the particles from coagulating or agglomerating. Fatty acids, such as oleic acid, have been used as dispersing agents to stabilize magnetic particle suspensions in some low molecular-weight non-polar hydrocarbon liquids. These low molecular-weight non-polar hydrocarbon liquids are relatively volatile solvents such as kerosene, toluene and the like. Due to their relative volatility, evaporation of these volatile hydrocarbon liquids is an important drawback as it deteriorates the function of the magnetic fluid itself. Thus to be useful, a magnetic fluid must be made with a low vapor-pressure carrier liquid and not with a low-boiling point hydrocarbon liquid.

The surfactants/dispersants have two major functions. The first is to assure a permanent distance between the magnetic particles to overcome the forces of attraction caused by Van der Waal forces and magnetic attraction, i.e. to prevent coagulation or agglomeration. The second is to provide a chemical composition on the outer surface of the magnetic particle that is compatible with the liquid carrier.

The saturation magnetization (G) of magnetic fluids is a function of the disperse phase volume of magnetic materials in the magnetic fluid. In magnetic fluids, the actual disperse phase volume is equal to the phase volume of magnetic particles plus the phase volume of the attached dispersant. The higher the magnetic particle content, the higher the saturation magnetization. The type of magnetic particles in the fluid also determines the saturation magnetization of the fluid. A set volume percent of metal particles in the fluid such as cobalt and iron generates a higher saturation magnetization than the same volume percent of ferrite. The ideal saturation magnetization for a magnetic fluid is determined by the application. For instance, saturation magnetization values for exclusion seals used in hard disk drives are typically lower than those values for vacuum seals used in the semiconductor industry.

The viscosity of the magnetic fluid is a property that is preferably controlled since it affects the suitability of magnetic fluids for particular applications. The viscosity of magnetic fluids may be predicted by principles used to describe the characteristics of an ideal colloid. According to the Einstein relationship, the viscosity of an ideal colloid is $$(N/N_0)=1+\alpha\phi$$

where $N$=colloid viscosity $N_0$=carrier liquid viscosity $\alpha$=a constant; and $\phi$=disperse phase volume Gel time is a function of the life expectancy of the magnetic fluid. A magnetic fluid's gel time is dependent on various factors including temperature, viscosity, volatile components in the carrier liquid and in the dispersants, and saturation magnetization. Evaporation of the carrier liquid and oxidative degradation of the dispersant occurs when the magnetic fluid is heated. Acidic degradation of the dispersant occurs when the magnetic fluid is exposed to an acid environment. Oxidative and acidic degradation of the dispersant increases the particle-to-particle attraction within the colloid resulting in gelation of the magnetic colloid at a much more rapid rate than would occur in the absence of either oxidative or acidic degradation. The actual mechanism of acidic degradation is unknown, but it is theorized that the acid attacks the magnetic particles and dissolves the surface of the particles causing the dispersant to detach.

Most of the magnetic fluids employed today have one to three types of surfactants arranged in one, two or three layers around the magnetic particles. The surfactants for magnetic fluids are long chain molecules having a chain length of at least sixteen atoms such as carbon, or a chain of carbon and oxygen, and a functional group at one end. The chain may also contain aromatic hydrocarbons. The functional group can be cationic, anionic or nonionic in nature. The functional group is attached to the outer layer of the magnetic particles by either chemical bonding or physical force or a combination of both. The chain or tail of the surfactant provides a permanent distance between the particles and compatibility with the liquid carrier.

Various magnetic fluids and the processes for making the same have been devised in the past. The oil-based carrier liquid is generally an organic molecule, either polar or nonpolar, of various chemical compositions such as hydrocarbon (polyalpha olefins, aromatic chain structure molecules), esters (polyol esters), silicone, or fluorinated and other exotic molecules with a molecular weight range up to about eight to nine thousand. Most processes use a low boiling-point hydrocarbon solvent to peptize the ferrite particles. To evaporate the hydrocarbon solvent from the resultant oil-based magnetic fluid in these processes, all of these processes require heat treatment of the magnetic fluid at about 70° C. and higher or at a lower temperature under reduced pressure. Because there are a number of factors that affect the physical and chemical properties of the magnetic fluids and that improvements in one property may adversely affect another property, it is difficult to predict the effect a change in the composition or the process will have on the overall usefulness of a magnetic fluid. It is known in the art that magnetic fluids in which one of the dispersants is a fatty acid, such as oleic, linoleic, linolenic, stearic or isostearic acid, are susceptible to oxidative degradation of the dispersant system. This results in gelation of the magnetic fluid. This becomes even more of a problem when the magnetic fluid is exposed to an acidic environment.

U.S. Pat. No. 5,676,877 (1997, Borduz et al.) teaches a composition and a process for producing a chemically stable magnetic fluid having finely divided magnetic particles covered with surfactants. A surface modifier is also employed which is added to cover thoroughly the free oxidizable exterior surface of the outer layer of the particles to assure better chemical stability of the colloidal system. The surface modifier is an alkylalkoxide silane.

U.S. Pat. No. 5,013,471 (1991, Ogawa) teaches a magnetic fluid, a method of production and a magnetic seal apparatus using the magnetic fluid. The magnetic fluid has ferromagnetic particles covered with a monomolecular adsorbed film composed of a chloro-silane type surfactant having a chain with ten to twenty-five atoms of carbon. Fluorine atoms are substituted for the hydrogen atoms of the hydrocarbon chain of the chlorosilane surfactant used in this process. According to this reference, the chlorosilane surfactant has to be large enough to disperse the particles and to assure the colloidal stability of the magnetic fluid by providing sufficient distance between the particles.

U.S. Pat. No. 5,143,637 (1992, Yokouchi et al.) teaches a magnetic fluid consisting of ferromagnetic particles dispersed in an organic solvent, a low molecular weight dispersing agent, and an additive with a carbon number between twenty-five and fifteen hundred. The low molecular weight dispersing agent is used to disperse the particles in an organic carrier. In the summary of this reference, there is a discussion about using a coupling agent, such as silane, as a dispersant. However, the coupling agent has to have a large enough molecular weight to perform as a dispersant. It should be mentioned that, in U.S. Pat. No. 5,143,637, there is no particular disclosure claim directed to using silane as an additive or even as a dispersant. The thermal stability of the fluid is increased by adding a high molecular weight additive, e.g. up to twenty thousand, such as polystyrene, polypropylene, polybutene, or polybutadiene polymers.

U.S. Pat. No. 4,554,088 (1985, Whitehead et al.) teaches use of a polymeric silane as a coupling agent. The coupling agents are a special type of surface-active chemicals that have functional groups at both ends of the long chain molecules. One end of the molecule is attached to the outer oxide layer of the magnetic particles and the other end of the molecule is attached to a specific compound of interest in those applications, such as drugs, antibodies, enzymes, etc.

None of the prior art proposes or suggests the use of low molecular weight fluorocarbon silanes as surface modifiers to cover the surface area of the magnetic particles, which is not already covered by the larger-sized surfactants, for increasing a magnetic fluid's stability in acidic environments.

Therefore, what is needed is a magnetic fluid that has a low molecular weight surface modifier covering the exposed surface area of the magnetic particles, not already covered by the larger-sized surfactants, for increasing a magnetic fluid's stability in acidic environments. What is also needed is a magnetic fluid that has a low molecular weight silane-based surface modifier covering the exposed surface area of the magnetic particles, not already covered by the larger-sized surfactants, for increasing a magnetic fluid's stability in acidic environments. What is further needed is a magnetic fluid that has a low molecular weight fluorocarbon/silane based surface modifier covering the exposed surface area of the magnetic particles, not already covered by the larger-sized surfactants, for increasing a magnetic fluid's stability in acidic environments. What is yet further needed is a fluorocarbon-based, hydrocarbon-based or ester-based magnetic fluid that has a low molecular weight fluorocarbon/silane based surface modifier covering the exposed surface area of the magnetic particles, not already covered by the larger-sized surfactants, for increasing a magnetic fluid's stability in acidic environments. Finally what is needed is a process for making a fluorocarbon-based, hydrocarbon-based or ester-based magnetic fluid that has increased stability in acidic environments.

SUMMARY OF THE INVENTION

It is an object of the present invention to provide a magnetic fluid that has a low molecular weight surface modifier covering the exposed surface area of the magnetic particles, not already covered by the larger-sized surfactants, and that has increased stability in acidic environments. It is a further object of the present invention to provide a magnetic fluid that has a low molecular weight silane-based surface modifier covering the exposed surface area of the magnetic particles, not already covered by the larger-sized surfactants, and that has increased stability in acidic environments. It is still a further object of the present invention to provide a magnetic fluid that has a low molecular weight fluorocarbon/silane based surface modifier covering the exposed surface area of the magnetic particles, not already covered by the larger-sized surfactants, and to increase a magnetic fluid's stability in acidic environments. It is another object of the present invention to provide a fluorocarbon-based, hydrocarbon-based or ester-based magnetic fluid that has a low molecular weight fluorocarbon/silane based surface modifier covering the exposed surface area of the magnetic particles, not already covered by the larger-sized surfactants, and to increase a magnetic fluid's stability in acidic environments. It is yet a further object of the present invention to provide a process for making a fluorocarbon-based, hydrocarbon-based or ester-based magnetic fluid that has increased stability in acidic environments.

The present invention achieves these and other objectives by providing a magnetic fluid and a process for making a magnetic fluid where the magnetic fluid's resistance to acid attack is enhanced.

A magnetic fluid has to exhibit stability in two areas in order to be used in current industrial applications. The first is to have magnetic stability under a very high magnetic field gradient. The magnetic particles tend to agglomerate and aggregate under high magnetic field gradients and separate out from the rest of the colloid. The second is to have chemical stability relating to oxidation of the surfactant and the organic oil carrier. All the organic oils undergo a slow or rapid oxidation process over the course of time. This results in an increased viscosity of the oil to the point where the oil becomes a gel or solid. In environments where the magnetic fluid may be exposed to acidic agents, the magnetic fluid must also exhibit chemical stability relating to acidification of the surfactant and the organic oil carrier. As in oxidation, acidification may be slow or rapid over time, but in all cases acidification of the magnetic fluid increases the viscosity of the oil to the point where the oil becomes a gel or solid. Further, this increase in viscosity is much faster and gelation occurs sooner than that experienced with oxidation alone.

Magnetic fluids made according to the prior art all have relatively short gelation times when exposed to acids. Magnetic fluids of the present invention, however, have much longer useful lives when exposed to acids.

The present invention provides for a magnetic fluid composed of magnetic particles coated with a surfactant followed by coating with a small molecular weight fluorocarbon/silane-surface modifier. The magnetic fluid of the present invention is made up of four components, namely an oil carrier liquid, one or more of an organic surfactant/dispersant, a fluorocarbon-silane-surface modifier, and fine magnetic particles. Generally, the magnetic particles coated with one or more surfactants are obtained from an magnetic ferrofluid by flocking the existing magnetic fluid with a compatible solvent, or, to save time, the magnetic particles are coated with surfactant/dispersant and then treated with the surface modifier before suspension in the base carrier liquid. This latter procedure eliminates making the completed magnetic fluid only to then flock the completed fluid to obtain the surfactant/dispersant-coated particles for treatment with the surface modifier.

It is believed that the small molecular weight fluorocarbon/silane surface modifier covers the area not covered by the surfactant used in the preparation of the magnetic fluid. The surfactant has a relatively long tail, which allows the surfactant coated magnetic particles to be dispersed in an organic solvent and/or in an oil-based carrier fluid. The present invention requires the surface modifier to have a very low molecular weight and not be a dispersant. The surface modifier must be of a very small molecular weight and size in order to be able to penetrate to the uncovered acidifiable surface of the magnetic particles through the tail of the surfactants already connected to that surface. It must also be able to attach and cover the surface and to protect the surface against acid attack.

For fluorocarbon-based magnetic fluids, Freon may be used as the flocking solvent. As an example, a mixture of Freon and fluorocarbon-based magnetic fluid is stirred and allowed to settle over a large Alnico V magnet. The solvent is decanted and the particles, which are coated with one or more surfactants, are suspended in an organic solvent. The organic solvent should be one that is compatible with the type of surfactant present on the magnetic particles. For example, a perfluorocarbon solvent may be used for particles coated with a surfactant.

A quantity, by weight, of surface modifier, preferably heptadecafluorodecyltrimethoxysilane, is added to the solvent-based ferrofluid. The solvent-based ferrofluid is heated to evaporate approximately half of the solvent. The solvent-based ferrofluid is then mixed with a volume of base oil and transferred to a vial or beaker. The volume of base oil added is such that the particle concentration should not be too high, but the saturation magnetization of the ferrofluid would be higher than the intended value even after evaporating the solvent. The solvent/base oil mixture is heated in the vial or beaker for about thirty minutes after evaporation of the solvent begins. After thirty minutes, the remaining solvent/base oil mixture is transferred to a large beaker/container and heated to remove all of the solvent. After removal of the solvent, the saturation magnetization of the oil-based ferrofluid is adjusted to an intended value by adding an appropriate amount of base oil. The base oil or carrier liquid may be a polar or a nonpolar liquid. Depending on the type of magnetic fluid, the base oil is selected from the group consisting of a fluorocarbon-based oil, a hydrocarbon-based oil and an ester-based oil. The base oil preferably has low volatility and low viscosity. For hydrocarbon-based oil the viscosity is generally in the range of about two centistokes to about twenty centistokes at about 100 degrees centigrade. The treated magnetic fluid, thus obtained, is then evaluated for its resistance to acid.

For hydrocarbon-based and ester-based magnetic fluids, organic solvents compatible for flocking these types of fluids are used. To save time in the manufacturing process, heptane-based ferrofluids having surfactant-coated magnetic particles are obtained that are then treated with the fluorocarbon/silane-surface modifier. This shortens the procedure by eliminating two steps in the process, the formation of an oil-based ferrofluid and the flocking step to remove the base oil so as to obtain surfactant-coated magnetic particles.

The treated magnetic fluid is then subjected to an acid environment. A quantity of treated magnetic fluid is added to several glass dishes. A quantity of acid is added on top of the ferrofluid layer in the glass dish and a drop of potassium thiocyanate is added to each sample. Acid containing potassium thiocyanate becomes bloody red by the generation of ferric ($Fe^{+3}$) ions from the ferrofluid. The test is a color reaction test. Because the magnetic particles of the magnetic fluid are coated with a surfactant and the small molecular weight surface modifier, the color of the acid indicates the magnetic fluid's ability to resist acid attack. The time required for the acid to become a bloody red was measured. The time values for treated magnetic fluid were compared to untreated magnetic fluid.

It was unexpected and surprising to find that the treated magnetic fluid was much more resistant to acid attack than untreated magnetic fluid. Typically, the treated magnetic fluid has 1.5 to 8 times better resistance to acid attack than the untreated magnetic fluid. This resistance to acid indicates that the treated magnetic fluid would continue to work and function as a magnetic fluid longer than untreated magnetic fluid when subjected to or exposed to an acid environment.

This can happen to magnetic fluids used in vacuum rotary spindle motors.

As further verification, the surfactant-coated particles treated with the fluorocarbon/silane-surface modifier before suspension in the oil-based carrier fluid were also tested for acid resistance. The test data indicates that ferrite particles coated with surfactant and the small molecular weight surface modifier is much more resistant to acid attack than ferrite particles coated with surfactant(s) only.

Several other small molecular weight fluorocarbon/silane-surface modifiers were tested as treating agents for fluorocarbon-based, hydrocarbon-based and ester-based magnetic fluids. It was also unexpected and surprising to discover that hydrocarbon-based and ester-based magnetic fluids treated with a small molecular weight fluorocarbon/silane-surface modifier also showed improved resistance to acid.

Additional advantages and embodiments of the invention will be set forth in part in the detailed description that follows, and in part will be apparent from the description, or may be learned by practice of the invention. It is understood that the foregoing general description and the following detailed description are exemplary and explanatory and are intended to provide further explanation of the invention as claimed.

DETAILED DESCRIPTION OF THE PREFERRED EMBODIMENT

Figure 1:
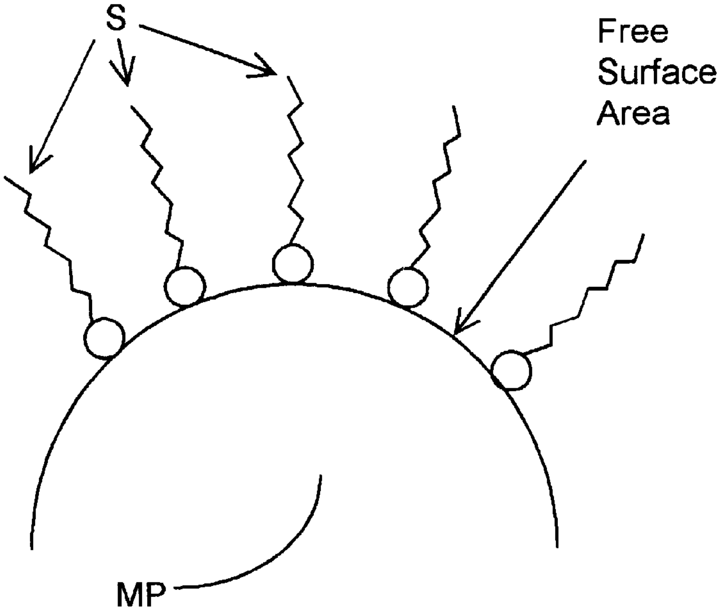
FIG. 1 shows an arrangement of long tail surfactants (S) on the magnetic particles (MP) of the prior art.

Repeated experiments show that organic oil undergoes a faster oxidation in contact with a solid surface, especially oxides. Mixing the oil with very small size magnetic particles significantly reduces the life of the oil. A simple calculation shows that a cubic centimeter of magnetic fluid of two hundred gauss (200 G) saturation magnetization has around ten to the sixteenth power ($10^{16}$) number of magnetic particles of one hundred angstrom diameter. This number of particles will provide approximately thirty square meters of outer surface area per cubic centimeter of magnetic fluid or per approximately 0.7 cubic centimeter volume of oil (about 0.55 grams) that is susceptible to oxidation or to acidic attack. The area could be much larger considering that the surface of the outer area is not uniform but has a topography of "mountains and valleys. " Because of steric repulsion and geometry, the surfactant will theoretically cover at best eighty to ninety percent of the outer area of the particles. There is about three to six square meters of uncovered outer area in contact with a very small amount of oil. This simple calculation shows that the major oxidation effect of the oil and surfactant is due to the immense surface of oxide from the uncovered surface area of the particles. FIG. 1 is an illustration of a magnetic particle (MP) having the surfactant (S) attached to the particle's surface.

Figure 2:
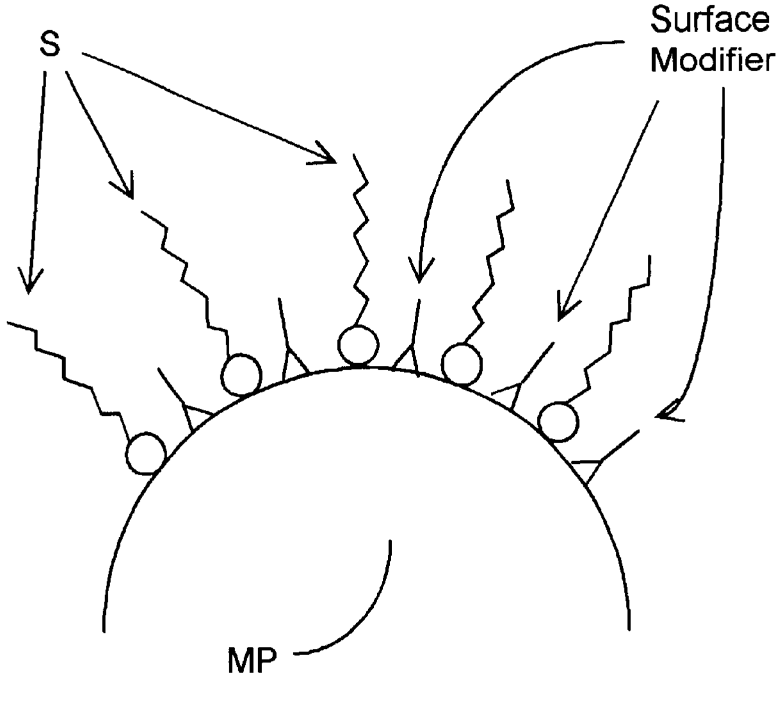
FIG. 2 shows an arrangement of long tail surfactants (S) on the magnetic particles (MP) with attachment of the small molecular weight surface modifier.

The present invention uses a surface modifier to cover the area not covered by the surfactant used in the preparation of the magnetic fluid. FIG. 2 shows the small molecular weight, fluorocarbon/silane-surface modifier attached to the particle's surface in the uncovered areas of the surface. The surface modifier has a very low molecular weight and cannot act as a dispersant. This is required so that the surface modifier can penetrate to the uncovered surface of the magnetic particles through the tails of the existing surfactant. The surface modifier must also be able to attach to and cover the surface of the particles to protect the surface against oxidation and acid attack.

The surface modifier used by the present invention consists of one to three similar functional groups at one end of the molecule and a very short tail of one to ten atoms. The surface modifier can be represented by the formulae $$R_{4-n}{}^{1}SiR_{n}{}^{2}$$

or $$R_{3-n}{}^{1}Si_{R_n}{}^{2}{}^{R^3}$$

where the group $R^1$ denotes a fluoroalkyl radical having one to ten carbon atoms, $R^2$ denotes a hydrolyzable radical chosen from the group consisting of alkoxides of one to three carbon atoms, $R^3$denotes an alkyl radical having one to three carbon atoms, and n is 1, 2 or 3 on average. In particular, heptadecafluorodecyltrimethoxysilane has been found to be a particularly useful surface modifier. In this particular surface modifier, $R^1$ denotes a heptadecafluorodecyl radical, $R^2$ denotes a methoxy radical and n is three. Examples of other useful surface modifiers are tridecafluorooctyltrimethoxysilane, heptadecafluorodecyltriethoxysilane, tridecafluorooctyltriethoxysilane, trifluoropropyltrimethoxysilane, and trifluoropropylmethyldimethoxysilane. The surface modifier for these additional examples can best be represented by the formulae $$(R^{1a}R^{1b})_{4-n}{}^{1}SiR_{n}{}^{2}$$

or $$(R^{1a}R^{1b})_{3-n}{}^{1}Si_{R_n}{}^{2}{}^{R^3}$$

wherein $R^{1a}$ denotes a fluoroalkyl radical having one to eight carbon atoms, $R^{1b}$ denotes an alkyl radical having one to two carbon atoms, $R^2$ denotes a hydrolyzable radical chosen from the group consisting of alkoxides of one to three carbon atoms, and $R^3$ denotes an alkyl radical having one to three carbon atoms, and n is 1, 2, or 3 on the average. The $R^1$, in this case, is represented by $R^{1a}R^{1b}$. The coupling mechanism to the free surface by the silane is thought to be either (1) that the alkoxy part of the surface modifier reacts with the proton from the inorganic hydroxyl group on the surface of the magnetic particles to form alcohol as a byproduct, or (2) that the silane surface modifier hydrolyzes with water absorbed on the particles or contained in the ferrofluid as an impurity, or (3) a combination of both, and the silicon connects to the outer layer of the magnetic particles by way of the oxygen from the hydroxyl group present on the surface modifier or on the outer layer of the magnetic particles.

During the reaction with the surface, the surface modifier becomes even smaller because a portion of the molecule, i.e. the alkoxide radicals, is eliminated as a by-product of this reaction.

There are several other ways to improve the chemical stability of the magnetic fluid such as adding a proper amount of antioxidant, choosing a good combination of a surfactant(s) and an oil carrier(s), having a substantially uniform particle size closer to one hundred angstroms, etc. After all of these options have been carefully considered, further improvement to a magnetic fluid's ability to withstand acid attack can be achieved by adding heptadecafluorodecyltrimethoxysilane or other small fluorocarbon/silane molecules with the same capacity to cover the magnetic particles.

The magnetic fluid of the present invention is made up of four components, namely an oil carrier liquid, one or more of an organic surfactant/dispersant, a fluorocarbon-silane surface modifier, and fine magnetic particles. The magnetic particles are generally ferrite particles having a diameter ranging in size from about thirty to about one hundred fifty angstroms. The surfactant/dispersant used in the magnetic fluid is selected from the group of surfactants consisting of cationic surfactants, anionic surfactants and nonionic surfactants. Generally, the magnetic particles coated with one or more surfactants are obtained from (1) an existing magnetic fluid by flocking the existing magnetic fluid with a compatible solvent, or (2) the magnetic particles are treated with the surface modifier by directly adding the surface modifier to the ferrofluid containing the magnetic particles, or (3) the magnetic particles are coated with surfactant/dispersant during the ferrofluid manufacturing process and then treated with the surface modifier before suspension in the base carrier liquid. The general process for making the magnetic fluid of the present invention includes obtaining surfactant/dispersant coated magnetic particles. These may be obtained by flocking a pre-made ferrofluid or obtained during the magnetic fluid manufacturing process. The surfactant-coated magnetic particles are then treated by adding a low molecular weight fluorocarbon-silane surface modifier and heated for a time to remove about 50% of the solvent. An amount of base oil, generally enough to be equal to about 20% by volume of the mixture of base oil and solvent-based fluid, is added to the surfactant-coated and surface modifier treated magnetic particles. Depending on the base oil used, the magnetic fluid is heated to a temperature in the range from about 60° C. to about 200° C. For hydrocarbon oil-based and ester oil-based carrier liquids, the temperature range is at the low end of the range, i.e. about 60° C. For fluorocarbon oil-based carrier liquids, the temperature range is generally from about 100° C. to about 200° C.

In the following procedures and examples, it is generally assumed that the higher the reaction temperature, the faster the reaction. Although a variety of reaction temperatures have not been tested, it is assumed that the reaction times would vary inversely with the reaction temperature.

For fluorocarbon-based magnetic fluids, Freon may be used as the flocking solvent. The following procedure is used for Examples 1–6.

Procedure for Treating Fluorocarbon Ferrofluid

Fifteen grams (15 g.) of a fluorocarbon ferrofluid is poured into a 200 cc beaker. The ferrofluid is flocculated with 45 cc of Freon by stirring and allowing the mixture to settle over a large Alnico V magnet. After five minutes, the top portion of solvent is decanted leaving the magnetic particles. The particles are re-suspended in 40 cc of perfluorocarbon solvent forming a solvent-based ferrofluid. Examples of a suitable solvent can be obtained from Ausimont USA Inc., New Jersey, USA (Fomblin PFS-1) and from the 3M Company (Cat. No. FC-77). 5.2 grams of a fluorocarbon-silane surface modifier, preferably heptadecafluorodecyltrimethoxysilane available from Toshiba Silicone Co., Ltd., Tokyo, Japan (Cat. No. TSL8233), is added to the solvent-based ferrofluid. The solvent-based ferrofluid is heated on a hot plate to evaporate some of the solvent so that approximately 20 cc of solvent-based ferrofluid remains. The remaining solvent-based ferrofluid is transferred to a 30 cc vial. 5 cc of base oil, preferably a perfluoroalkylether available from DuPont Chemicals, Delaware, USA (Cat. No. Krytox 143AB), is added to the solvent-based ferrofluid. The vial is placed on a hot plate and kept heating. After substantially all of the solvent is removed from the vial by evaporation in about 30 minutes, the remaining ferrofluid in the vial is transferred to a 200 cc beaker and heated to sufficiently to remove the remaining solvent. A sufficient amount of the base oil is added to the remaining ferrofluid so that the ferrofluid has a saturation magnetization of approximately 200 G.

The following test methods were used to test the resistance of the treated ferrofluid and the treated magnetic particles.

Test Method for Ferrofluid Resistance to Acid

Glass dishes having an inside diameter of approximately 12.9 mm, an outside diameter of approximately 15 mm and a length of approximately 10 mm were placed on cylindrically-shaped samarium-cobalt (SmCo) magnets having dimensions of about 15 mm (outside diameter) by 15 mm (height). A specific amount of sample of the treated fluorocarbon ferrofluid is added to each glass dish such that each glass dish contains a sample having a thickness of about 2 mm. A volume of acid is added to each glass dish in sufficient quantity so that the acid and ferrofluid occupies 80% of the dish volume. Hydrochloric acid having a concentration range of 0.1N, 0.075N, 0.04N, and 0.0075N, and sulfuric acid having a concentration of0.1N were used in the test examples. 1 drop of 3N potassium thiocyanate (KSCN) was added to each sample. Acid containing KSCN becomes bloody red in color by the generation of ferric ions ($Fe^{+3}$), which comes from the magnetic particles of the ferrofluid. The temperature of the samples was not controlled. Due to the time required to conduct the tests, water was occasionally added to each sample (except the samples in Example 3 where additional acid was added and not just water) to maintain the volume level of the acid above the ferrofluid. The time required for the color of the acid solution to turn bloody red is measured.

Test Method for Fluorocarbon Surfactant-Coated Magnetic Particle Resistance to Acid Glass dishes having an inside diameter of approximately 12.9 mm, an outside diameter of approximately 15 mm and a length of approximately 10 mm were placed on cylindrically-shaped SmCo magnets having dimensions of about 15 mm by 15 mm. A specific amount of sample of the treated fluorocarbon ferrofluid is added to each glass dish such that each glass dish contains a sample having approximately the same amount of particles. The amount of sample is calculated based on the densities of the samples. The calculation is represented by the following equation:

$$Ws=(d_s \times k_s)/Mss(g)$$

Where

Ws=the amount (weight) of sample $d_s$=density of sample $k_s$=V×Ms

V=volume of ferrofluid

Mss=saturation magnetization of the sample

Since Mss per unit volume is proportional to the concentration of the magnetic particles per unit volume, the constant $k_s$ is controlled for each sample such that each dish has approximately the same amount of magnetic particles contained in 0.047 cc of ferrofluid having a saturation magnetization of 350 G. The actual amount of magnetic particles in each dish is controlled to ±5% due to the accuracy of the balance.

For example, the constant $k_s$ for a 0.047 cc volume of a sample having a saturation magnetization of 350 G is 16.45.

Freon is then added to each glass dish to flocculate the magnetic particles. The slurry is stirred for about one minute. The slurry is allowed to stand for about one minute then the top solvent is removed by decantation. The remaining magnetic particles are washed five times with Freon as just described. The samples (magnetic particles) are left at room temperature for about 15 hours to allow the solvent to evaporate. A volume of acid is added to each glass dish in sufficient quantity so that the acid and fluid occupies 80% of the dish volume. Hydrochloric acid having a concentration of 0.01N and sulfuric acid having a concentration of 0.01N were used in the test samples. 1 drop of 3N potassium thiocyanate (KSCN) was added to each sample. The temperature of the samples was not controlled. Due to the time required to conduct the tests, water was occasionally added to each sample (except the samples in Example 3 where additional acid was added and not just water) to maintain the volume level of the acid above the ferrofluid. The time required for the color of the acid solution to turn bloody red is measured.

EXAMPLE 1

Six samples of ferrofluid, based on a fluorocarbon-based ferrofluid available from Ferrotec Corporation, Tokyo, Japan (Cat. No. VSG80), were tested for resistance to acid using the ferrofluid test method previously described. In each set of three samples, one of the samples was untreated ferrofluid (#1), another was untreated ferrofluid which had undergone the treating process (#2) but without the addition of the fluorocarbon-silane surface modifier, and the third was the ferrofluid treated with the fluorocarbon surface modifier (#3) as described in the treating process. The surface modifier is heptadecafluorodecyltrimethoxysilane available from Toshiba Silicone Co., Ltd Tokyo, Japan (Cat. No. TSL8233). The acids used were 0.1N hydrochloric acid (HCl) and 0.1N sulfuric acid ($H_2SO_4$). The results indicate that the fluorocarbon-silane treated ferrofluid has greater resistance to acid attack.

TABLE 1

Ferrofluid Test Data

| Sample | Time (hours) 0.1N HCl | 0.1N $H_2SO_4$ |
|---|---|---|
| #1 | 7–23 | 7–23 |
| #2 | 7–23 | 7–23 |
| #3 | 55–71 | 55–71 |

EXAMPLE 2

Six samples of surfactant- coated magnetic particles, based on a fluorocarbon-based ferrofluid available from Ferrotec Corporation, Tokyo, Japan (Cat. No. VSG80), were tested for resistance to acid using the magnetic particle test method previously described. In each set of three samples, sample #4 represents the ferrofluid that was flocked with Freon to obtain the surfactant-coated magnetic particles without the carrier oil. Sample #5 represents the ferrofluid that has undergone the treating procedure but without the addition of the fluorocarbon-silane surface modifier. Sample #6 represents the ferrofluid that has undergone the treating procedure with the addition of the surface modifier. The surface modifier is the same one used in Example 1. The acids used were 0.01N hydrochloric acid and 0.01N sulfuric acid. The results indicate that the fluorocarbon-silane treated magnetic particles have greater resistance to acid attack.

TABLE 2

Magnetic Particles Test Data

| Sample | Time (hours) 0.01N HCl | 0.01N $H_2SO_4$ |
|---|---|---|
| #4 | 8–24 | 5–8 |
| #5 | 0–1 | 0–1 |
| #6 | 32–48 | 8–24 |

EXAMPLE 3

Four samples of ferrofluid were prepared. Two of the samples are based on a fluorocarbon-based ferrofluid available from Ferrotec Corporation, Tokyo, Japan (Cat. No. VSG80), and two of the samples are based on a fluorocarbon-based ferrofluid available from Sigma Hi-chemical, Inc., Kanagawa, Japan (Cat. No. F-211). All samples were tested for resistance to acid using the ferrofluid test method previously described. In each set of two samples, sample #7 represents the untreated Ferrotec ferrofluid. Sample #8 represents the Ferrotec ferrofluid that has undergone the treating process. Sample #9 represents the untreated Sigma Hi-chemical ferrofluid and sample #10 represents the Sigma Hi-chemical ferrofluid that has undergone the treating process. The surface modifier is the same one used in Example 1. The acid used was 0.04N hydrochloric. The results indicate that the fluorocarbon-silane treated ferrofluid has greater resistance to acid attack.

TABLE 3

| Sample | Time (hours) 0.04N HCl |
|---|---|
| #7 | 100–175 |
| #8 (treated) | 250+ |
| #9 | 25–40 |
| #10 (treated) | 250+ |

Other fluorocarbon-silane surface modifiers were tested for their suitability for treatment of fluorocarbon-based ferrofluids. The surface modifiers are tridecafluorooctyltrimethoxysilane available from Toshiba Silicone Co., Ltd., Tokyo, Japan (Cat. No. TSL8257), heptadecafluorodecyltriethoxysilane available from Gelest, Inc., Pennsylvania, USA (Cat. No. SIT5841.2), tridecafluorooctyltriethoxysilane available from Gelest, Inc. (Cat. No. SIT8175.0), trifluoropropyltrimethoxysilane available from Gelest, Inc. (Cat. No. SIT8372), and trifluoropropylmethyldimethoxysilane available from United Chemical Technologies, Inc., Pennsylvania, USA (Cat. No. T2842). Examples 4, 5 and 6 describe the procedure and test results.

EXAMPLE 4

Four sets of samples of ferrofluid, based on a fluorocarbon-based ferrofluid available from Ferrotec Corporation (Cat. No. VSG80), were tested for resistance to acid using the ferrofluid test method previously described. Each set contained two samples. One set containing sample #11 was the untreated ferrofluid which had undergone the treating process but without the addition of the fluorocarbon-silane surface modifier. Each of the remaining three sets contained samples #12, #13 and #14. Samples #12, #13 and #14 were treated ferrofluids, each treated with the surface modifier indicated in Table 4. 0.52 grams of the Gelest brand of fluorocarbon-silane surface modifiers were used in the treating procedure instead of the 5.2 grams for the Toshiba Silicone brand fluorocarbon-silane surface modifiers. The acids used were 0.1N hydrochloric acid and 0.1N sulfuric acid. The results indicate that the fluorocarbon-silane treated ferrofluid has greater resistance to acid attack.

TABLE 4

| Sample | Time (hours) | |
|---|---|---|
| | 0.1N HCl | 0.1N $H_2SO_4$ |
| #11 - no surface modifier | 15–22 | 15–22 |
| #12 - TSL8257 | 22–40 | 22–40 |
| #13 - SIT5841.2 | 22–40 | 22–40 |
| #14 - SIT8175.0 | 22–40 | 22–40 |

EXAMPLE 5

Four sets of surfactant-coated magnetic particle samples, based on a fluorocarbon-based ferrofluid available from Ferrotec Corporation (Cat. No. VSG80), were tested for resistance to acid using the magnetic particle test method previously described. In each set of four samples, sample #15 represents the magnetic fluids which have undergone the treating procedure except for the addition of the fluorocarbon-silane surface modifier. Each of the remaining three sets contained samples #16, #17 and #18. Samples #16, #17 and #18 represents the magnetic fluids which have undergone the treating procedure with the surface modifier indicated in Table 5. The acids used were 0.01N hydrochloric acid and 0.01N sulfuric acid. The results indicate that the fluorocarbon-silane treated magnetic particles have greater resistance to acid attack.

TABLE 5

| Sample | Time (hours) | |
|---|---|---|
| | 0.01N HCl | 0.01N $H_2SO_4$ |
| #15 - no surface modifier | 25–33 | 25–33 |
| #16 - TSL8257 | 25–48 | 33–48 |
| #17 - SIT5841.2 | 33–48 | 33–48 |
| #18 - SIT8175.0 | 25–48 | 33–48 |

EXAMPLE 6

Two sets of samples, based on a fluorocarbon-based ferrofluid available from Ferrotec Corporation (Cat. No. VSG80), were prepared. One set was tested for resistance to acid using the ferrofluid test method previously described. The second set was tested for resistance to acid using the magnetic particle test method previously described. Each set contained four samples. Sample #19 in Set 1 was the untreated ferrofluid which had undergone the treating process but without the addition of the fluorocarbon-silane surface modifier. Each of the remaining three samples in Set 1 (samples #20, #21 and #22) were treated ferrofluids, each treated with the surface modifier indicated in Table 6. Sample #23 of Set 2 was the untreated ferrofluid magnetic particles which had undergone the treating process but without the addition of the fluorocarbon-silane surface modifier. Each of the remaining three samples in Set 2 (samples #24, #25 and #26) were treated magnetic particles, each treated with the surface modifier indicated in Table 6. Samples #20 and #24 were treated with 0.325 grams of the SIT8372 surface modifier. Samples #21 and #25 were treated with 0.065 grams of SIT8372 surface modifier. Samples #22 and #26 were treated with and 0.061 grams of T2842 surface modifier. The stated amounts of surface modifier used replaced the 5.2 grams of surface modifier described in the treating procedure. The acids used were 0.075N hydrochloric acid for the ferrofluids and 0.0075N hydrochloric acid for the magnetic particles. The results indicate that small molecular weight fluorocarbon-silane surface modifiers can also be used to treat fluorocarbon-based ferrofluids and magnetic particles to impart to the ferrofluids and the magnetic particles a greater resistance to acid attack.

TABLE 6

| Sample | Time (hours) | |
|---|---|---|
| | 0.075N HCl (Ferrofluids) | 0.0075N HCl (Magnetic Particles) |
| #19/#23 - no surface modifier | 65–80 | 33–51 |
| #20/#24 - SIT8372(a) | 88–103 | 55–60 |
| #21/#25 - SIT8372(b) | 103–111 | 78–82 |
| #22/#26 - T2842 | 88–103 | 60–75 |

The inventors further developed a procedure for treating smaller samples of ferrofluids and magnetic particles to reduce the volume of the test solution required, thus making it more economical to perform a larger number of tests. The inventors also developed a procedure for treating ferrofluids directly without the need for flocking the ferrofluids with Freon, thus eliminating a step in the treating process. This new procedure also saves time, is more economical, and produces less hazardous waste (Freon containing base oil). These new procedures also yielded improvements in the ferrofluids' and magnetic particles' resistance to acid attack.

Procedure for Treating a Small Sample of Fluorocarbon Ferrofluid

Five grams of VSG80 is poured in a 100 cc beaker. The ferrofluid is flocculated with 15 cc of Freon over a magnet. After about five minutes, the top portion of solvent is decanted. The remaining particles are re-suspended in about 3 to 4 cc of PFS-1 and heated mildly forming a solvent-based ferrofluid. The solvent-based ferrofluid is poured into a 10 cc vial. The vial is placed on a hot plate and a thermocouple is inserted to monitor the fluid temperature. After the solvent started evaporating and when the total volume of the solvent-based ferrofluid reached about 2 to 3 cc, 1 cc (1.9 g) of a carrier oil is added forming a solvent-carrier oil mix. When the temperature of the mix reaches about 160° C., a specific amount of surface modifier is added. The surface modifier mix is continuously heated. When the temperature of the surface modifier mix reaches about 200° C., the fluid color turns from brown to brown-black. When the ferrofluid reaches 230° C., the ferrofluid is removed from the hot plate and allowed to cool. During the cooling process, carrier oil is added to the ferrofluid to adjust the saturation magnetization to about 350 G.

Procedure for Treating a Fluorocarbon Ferrofluid Without Flocking

Five grams of VSG80 is poured into a 10 cc vial. 2 cc of PFS-1 is added to the vial and stirred well. The vial is placed onto a hot plate and the fluid temperature is monitored with a thermocouple. A specific amount of surface modifier is added when the temperature of the ferrofluid reaches about 160° C. The surface modifier mix is continuously heated.

When the temperature of the surface modifier mix reaches about 200° C., the fluid color turns from brown to brown-black. When the ferrofluid reaches 230° C., the ferrofluid is removed from the hot plate and allowed to cool. During the cooling process, carrier oil is added to the ferrofluid to adjust the saturation magnetization to about 350 G.

EXAMPLE 7

Two sets of samples, based on a fluorocarbon-based ferrofluid available from Ferrotec Corporation (Cat. No. VSG80), were prepared. One set was tested for resistance to acid using the ferrofluid acid test method previously described. The second set was tested for resistance to acid using the magnetic particle acid test method previously described. Each set contained four samples. Sample #27 in Set 1 was the untreated ferrofluid which had undergone the treating process but without the addition of the fluorocarbon-silane surface modifier. Each of the remaining three samples in Set 1 (samples #28, #29 and #30) were treated ferrofluids, each treated with the surface modifier indicated in Table 7. Samples #27, #28, #31 and #32 were treated according to the "Procedure for Treating a Small Sample of Fluorocarbon Ferrofluid." Samples #29, #30, #33, and #34 were treated according to the "Procedure for Treating a Fluorocarbon Ferrofluid Without Flocking." Sample #31 of Set 2 was the untreated ferrofluid magnetic particles which had undergone the treating process but without the addition of the fluorocarbon-silane coupling. Each of the remaining three samples in Set 2 (samples #32, #33 and #34) were treated magnetic particles, each treated with the surface modifier indicated in Table 7. Samples #28, #29, #32, and #33 were treated with 0.85 grams of the TSL8233 surface modifier. Samples #30 and #34 were treated with 1.7 grams of TSL8257 surface modifier. The acids used were 0.1N hydrochloric acid for the ferrofluids and 0.01N hydrochloric acid for the magnetic particles. The results indicate that small molecular weight fluorocarbon-silane surface modifiers can also be used to successfully treat fluorocarbon-based ferrofluids and magnetic particles directly without the flocking process to impart to the ferrofluids and the magnetic particles a greater resistance to acid attack.

TABLE 7

| | Time (hours) | |
|---|---|---|
| Sample | 0.1N HCl (Ferrofluids) | 0.01N HCl (Magnetic Particles) |
| #27/#31 - no surface modifier (flocked) | 23–42 | 3–17 |
| #28/#32 - TSL8233 (flocked) | 49–64 | 38–46 |
| #29/#33 - TSL8233 | 46–49 | 23–38 |
| #30/#34 - TSL8257 | 46–49 | 23–38 |

The inventors have also found that fluorocarbon-silane surface modifiers can also enhance the acid resistance of hydrocarbon-based and ester-based ferrofluids. By treating the surfactant-coated magnetic particles with these fluorocarbon-based surface modifiers that cannot act as dispersants, it has been found that the acid resistance of treated ferrofluids is about 2–20 times better depending on the surface modifier and the amount of surface modifier used. The following examples include a method of preparing the treated hydrocarbon-based and ester-based ferrofluids. The treatment with the surface modifiers was performed as an intermediate step in the ferrofluid manufacturing process where the ferrofluid is a heptane-based ferrofluid prior to conversion to an oil-based ferrofluid. It should be understood from the following descriptions that the heptane-based ferrofluids contain magnetic particles coated with a surfactant/dispersant. In the case of a hydrocarbon oil-based ferrofluid, the surfactant is oleic acid. The surfactant used for the ester-based ferrofluid is a dispersant known as 12-hydroxystearic acid isostearate and is available from Ferrotec Corporation. The acid test methodology used on both treated and untreated hydrocarbon-based and ester-based ferrofluids was previously described as the Test Method for Ferrofluid Resistance to Acid.

Procedure for Treating Hydrocarbon-based and Ester-based Ferrofluids

The following treatment procedure is used to treat both hydrocarbon-based and ester-based ferrofluids. 30 cc of the heptane-based ferrofluid having 200 G, described below, is placed in a 200 cc beaker. A specific amount of surface modifier is added to and mixed with the heptane-based ferrofluid. The ferrofluid-surface modifier mix is heated to about 60° C. and stirred for about 30 minutes. A sufficient amount of base oil is added to the remaining ferrofluid so that the ferrofluid has a saturation magnetization of approximately 200 G.

Preparation of Hydrocarbon-based Ferrofluid

A heptane-based hydrocarbon ferrofluid was prepared using oleic acid as the surfactant/dispersant in the following way. 52 grams of ferrous sulfate heptahydrate was dissolved in water and stirred to form about 200 cc mixture. 85 cc of 42 Baume ferric chloride was added to the water mixture and stirred until a homogeneous mixture was obtained. About 125 cc of 26% ammonium hydroxide was mixed with about 70 cc of water. The iron ion homogenous mixture was poured into the mixture of 26% ammonium hydroxide and water and stirred until homogeneous. Oleic soup that consisted of 8.6 cc of oleic acid and 11 cc of 26% ammonia solution was also prepared. The oleic soap was then added to the magnetite ($Fe_3O_4$) particle slurry to cover the particles with an oleic ion. 120 cc of heptane were poured into the oleic-covered particle slurry, and the entire slurry was stirred for about 5 minutes. About 27 cc of acetone was added to this slurry and stirred for about 5 minutes. The acetone-slurry mixture is then allowed to stand and separate for about 1 hour. The fluid, which rose to the top, was then siphoned off and the volume was reduced by heating to adjust the saturation magnetization to be about 200 G.

EXAMPLE 8

Three samples of heptane-based ferrofluid were subjected to the treatment process described under Procedure for Treating Hydrocarbon-based and Ester-based Ferrofluids, except that no surface modifier was added to one sample. Sample #35 had undergone the treatment process but no surface modifier was added. Sample #36 was treated with 2.6 grams of SIT8372.0 and sample #37 was treated with 2.4 grams of T2842. The base oil used to adjust the saturation magnetization is nonpolar carrier liquid, preferably a poly-alpha olefin oil. Such oils are readily available commercially. For example, SYNTHANE oils produced by Gulf Oil company, Durasyn oils produced by Amoco Chemicals or oils produced by Henkel Corporation/Emery Group having viscosities of 2, 4, 6, 8 or 10 centistokes (cSt) at 100° C. are useful as nonpolar carriers. The polyalpha olefin used in this example is a 4 cSt oil known as 3004 and available from Henkel Corporation, Emery Group, Ohio, USA. The samples were subjected to the acid test previously described under Test Method for Ferrofluid Resistance to Acid. The data indicates that the hydrocarbon-based ferrofluids treated with the surface modifiers increased the ferrofluids resistance to acid attack from about 8 to about 20 times over an untreated ferrofluid.

TABLE 8

| Sample | Time (hours) 0.1N HCl |
|---|---|
| #35 - no surface modifier | 0–1 |
| #36 - SIT8372.0 | 8–20 |
| #37 - T2842 | 8–20 |

EXAMPLE 9

Three samples of heptane-based ferrofluid were subjected to the treatment process described under Procedure for Treating Hydrocarbon-based and Ester-based Ferrofluids, except that no surface modifier was added to one sample. Sample #38 had undergone the treatment process but no surface modifier was added. Sample #39 was treated with 6.8 grams of TSL8233, sample #40 was treated with 5.6 grams of TSL8257, and sample #41 was treated with 0.56 grams of TSL8257. The base oil used to adjust the saturation magnetization is the same one used in Example 8. The samples were subjected to the acid test previously described under Test Method for Ferrofluid Resistance to Acid. The data indicates that the hydrocarbon-based ferrofluids treated with these surface modifiers increased the ferrofluids resistance to acid attack from about 1.5 to about 4.5 times over an untreated ferrofluid.

TABLE 9

| Sample | Time (hours) 0.1N HCl |
|---|---|
| #38 - no surface modifier | 0–5 |
| #39 - TSL8233 | 8–23 |
| #40 - TSL8257 | 8–23 |
| #41 - TSL8257 | 5–8 |

Preparation of Ester-based Ferrofluid

A heptane-based hydrocarbon ferrofluid was prepared using 12-hydroxystearic acid isostearate, available from Ferrotec Corporation, as the surfactant/dispersant in the following way. 52 grams of ferrous sulfate heptahydrate was dissolved in water and stirred to form about a 200 cc mixture. 85 cc of 42 Baume ferric chloride was added to the water mixture and stirred until a homogeneous mixture was obtained. About 125 cc of 26% ammonium hydroxide was mixed with about 70 cc of water. The iron ion homogeneous mixture was poured into the mixture of 26% ammonium hydroxide and water and stirred until homogeneous. The $Fe_3O_4$ particle slurry was heated and reached a temperature of about 60–70° C. About 50 cc of 12-hydroxystearic acid isostearate, dissolved in about 450 cc of heptane, was heated to about 70° C. and added to the stirring warm magnetite slurry. The mixture was then stirred for about 5 minutes. To this mixture was added about 350 cc of acetone and the mixture was stirred for about 5 minutes. The acetone-slurry mixture is then allowed to stand and separate for about 1 hour. The fluid, which rose to the top, was then siphoned off and the volume was reduced by heating to adjust the saturation magnetization to be about 200 G.

EXAMPLE 10

Three samples of heptane-based ferrofluid were subjected to the treatment process described under Procedure for Treating Hydrocarbon-based and Ester-based Ferrofluids, except that no surface modifier was added to one sample. Sample #42 had undergone the treatment process but no surface modifier was added. Sample #43 was treated with 2.6 grams of SIT8372.0 and sample #44 was treated with 2.4 grams of T2842. The base oil used to adjust the saturation magnetization is a polar ester carrier liquid, which include polyesters of saturated hydrocarbon acids such as $C_6$–$C_{12}$ hydrocarbon acids, phthalates such as dioctyl and other dialkyl phthalates, citrate esters, and trimellitate esters such as tri(n octyl/n-decyl) esters. Other suitable polar ester carrier liquids include esters of phthalic acid derivatives such as triaryl, trialkyl or alkylaryl phosphates, and epoxy derivatives such as epoxidized soybean oil. The preferred polar ester carrier liquid used in this example is a trimellitate ester. More preferably, the carrier liquid is a trimellitate triester, which are widely used as plasticizers in the wire and cable industry. The preferred trimellitate triester, for example, is available from Aristech Chemical Corporation, Pennsylvania, USA, under the trade name PX336. The samples were subjected to an acid test previously described under Test Method for Ferrofluid Resistance to Acid. The data indicates that ester-based ferrofluids treated with these surface modifiers increases the ferrofluids resistance to acid attack from about 1 to about 3 times over an untreated ester-based ferrofluid.

TABLE 10

| Sample | Time (hours) 0.1N HCl |
|---|---|
| #42 - no surface modifier | 0–2 |
| #43 - SIT8372.0 | 2–3 |
| #44 - T2842 | 0–2 |

EXAMPLE 11

Three samples of heptane-based ferrofluid were subjected to the treatment process described under Procedure for Treating Hydrocarbon-based and Ester-based Ferrofluids, except that no surface modifier was added to one sample. Sample #45 had undergone the treatment process but no surface modifier was added. Sample #46 was treated with 6.8 grams of TSL8233, sample #47 was treated with 0.68 grams of TSL8233, and sample #48 was treated with 5.6 grams of TSL8257. The base oil used to adjust the saturation magnetization is the same one used in Example 10. The samples were subjected to the acid test previously described under Test Method for Ferrofluid Resistance to Acid. The data indicates that the ester-based ferrofluids treated with these surface modifiers increased the ferrofluids resistance to acid attack from about 2 to about 12 times over an untreated ferrofluid.

TABLE 11

| Sample | Time (hours) 0.1N HCl |
|---|---|
| #45 - no surface modifier | 0–2 |
| #46 - TSL8233 | 8–23 |
| #47 - TSL8233 | 2–5 |
| #48 - TSL8257 | 8–23 |

What is claimed is:

1. A magnetic fluid composition comprising:

a carrier liquid; and a plurality of magnetic particles coated with at least one surfactant and a fluorocarbon-silane surface modifier, said surface modifier being a nondispersant and improving the acid resistance of said magnetic fluid.

2. The composition of claim 1 wherein said carrier liquid is a polar or a nonpolar liquid.

3. The composition of claim 2 wherein said carrier liquid is selected from the group consisting of a fluorocarbon-based oil, a hydrocarbon-based oil and an ester-based oil having low volatility and low viscosity.

4. The composition of claim 3 wherein said hydrocarbon-based carrier liquid has a viscosity of about 2 centistokes to about 20 centistokes at about 100° C.

5. The composition of claim 1 wherein said surface modifier is a fluorocarbon-silane surface modifier represented by the formula $$R_{4-n}{}^{1}SiR_n{}^{2}$$

wherein $R^1$ denotes a fluoroalkyl radical having one to ten carbon atoms, $R^2$ denotes a hydrolyzable radical chosen from the group consisting of alkoxides of one to three carbon atoms, and n is 1, 2, or 3 on the average.

6. The composition of claim 1 wherein said surface modifier is a fluorocarbon-silane surface modifier represented by the formula $$(R^{1a}R^{1b})_{4-n}{}^{1}SiR_n{}^{2}$$

wherein $R^{1a}$ denotes a fluoroalkyl radical having one to eight carbon atoms, $R^{1b}$ denotes an alkyl radical having one to two carbon atoms, $R^2$ denotes a hydrolyzable radical chosen from the group consisting of alkoxides of one to three carbon atoms, and n is 1, 2, or 3 on the average.

7. The composition of claim 1 wherein said surface modifier is a fluorocarbon-silane surface modifier represented by the formula $$(R^{1a}R^{1b})_{3-n}{}^{1}Si_{R_n}{}_{2}{}^{R^3}$$

wherein $R^{1a}$ denotes a fluoroalkyl radical having one to eight carbon atoms, $R^{1b}$ denotes an alkyl radical having one to two carbon atoms, $R^2$ denotes hydrolyzable radical chosen from the group consisting of alkoxides of one to three carbon atoms, $R^3$ denotes an alkyl radical having one to three carbon atoms, and n is 1 or 2.

8. The composition of claim 1 wherein said surface modifier is one of a fluoroalkyl alkoxy silane and a fluoroalkyl alkyl alkoxy silane.

9. The composition of claim 1 wherein said surface modifier is selected from the group consisting of heptadecafluorodecyltrimethoxysilane, tridecafluorooctyltrimethoxysilane, heptadecafluorodecyltriethoxysilane, tridecafluorooctyltriethoxysilane, trifluoropropyltrimethoxysilane, and trifluoropropylmethyldimethoxysilane.

10. The composition of claim 1 wherein said plurality of magnetic particles are ferrite which have a diameter size ranging from about thirty to about one hundred fifty angstroms.

11. The composition of claim 1 wherein said at least one surfactant is selected from the class of surfactants consisting of cationic surfactants, anionic surfactants and nonionic surfactants.

12. A magnetic fluid composition comprising:

a carrier liquid;

a plurality of magnetic particles dispersed within said carrier liquid wherein said plurality of magnetic particles are coated with at least one surfactant; and a fluorocarbon-silane surface modifier coated on said plurality of magnetic particles wherein said surface modifier is one of a fluoroalkyl alkoxy silane and a fluoroalkyl alkyl alkoxy silane, said surface modifier being a nondispersant and improving the acid resistance of said magnetic fluid.

13. The composition of claim 12 wherein said surface modifier is a fluorocarbon-silane surface modifier represented by the formula $$R_{4-n}{}^{1}SiR_n{}^{2}$$

wherein $R^1$ denotes a fluoroalkyl radical having one to ten carbon atoms, $R^2$ denotes a hydrolyzable radical chosen from the group consisting of alkoxides of one to three carbon atoms, and n is 1, 2, or 3 on the average.

14. The composition of claim 12 wherein said surface modifier is a fluorocarbon-silane surface modifier represented by the formulae $$(R^{1a}R^{1b})_{4-n}{}^{1}SiR_n{}^{2}$$

or $$(R^{1a}R^{1b})_{3-n}{}^{1}Si_{R_n}{}_{2}{}^{R^3}$$

wherein $R^{1a}$ denotes a fluoroalkyl radical having one to eight carbon atoms, $R^{1b}$ denotes an alkyl radical having one to two carbon atoms, $R^2$ denotes a hydrolyzable radical chosen from the group consisting of alkoxides of one to three carbon atoms, and $R^3$ denotes an alkyl radical having one to three carbon atoms, and n is 1, 2, or 3 on the average.

15. The composition of claim 12 wherein said surface modifier is selected from the group consisting of heptadecafluorodecyltrimethoxysilane, tridecafluorooctyltrimethoxysilane, heptadecafluorodecyltriethoxysilane, tridecafluorooctyltriethoxysilane, trifluoropropyltrimethoxysilane, and trifluoropropylmethyldimethoxysilane.

16. A method of making a magnetic fluid composition, said method comprising the steps of:

preparing a solvent-based magnetic fluid having a plurality of magnetic particles coated with at least one of a cationic, an anionic and a nonionic surfactant;

adding to said solvent-based magnetic fluid a low molecular weight fluorocarbon-silane surface modifier to improve the acid resistance of said composition wherein said surface modifier is represented by the formula $$(R_{4-n}{}^{1}SiR_n{}^{2}$$

or $$(R_{3-n}{}^{1}Si_{R_n}{}_{2}{}^{R^3}$$

wherein $R^1$ denotes a fluoroalkyl radical having one to ten carbon atoms, $R^2$ denotes a hydrolyzable radical chosen from the group consisting of alkoxides of one to three carbon atoms, $R^3$ denotes an alkyl radical having one to three carbon atoms and n is 1, 2, or 3 on the average;

removing a substantial portion of said solvent base from said solvent-based magnetic fluid; and adding a compatible high molecular weight organic carrier liquid to said magnetic fluid.

17. The method of claim 16 wherein said $R^1$ further comprises the formula $R^{1a}R^{1b}$ wherein $R^{1a}$ denotes a fluoroalkyl radical having one to eight carbon atoms and $R^{1b}$ denotes an alkyl radical having one to two carbon atoms.

18. The method of claim 16 wherein said step of removing said solvent base further includes evaporating said solvent base from said solvent-based magnetic fluid.

19. The method of claim 18 wherein said evaporating step includes heating said solvent-based magnetic fluid to a temperature in the range from about 60° C. to about 200° C.

20. The method of claim 19 wherein said evaporating step includes heating said solvent-based magnetic fluid to about 60° C. when said carrier liquid is a hydrocarbon oil-based carrier liquid or an ester oil-based carrier liquid.

21. The method of claim 19 wherein said evaporating step includes heating said solvent-based magnetic fluid to about 200° C. when said carrier liquid is a fluorocarbon oil-based carrier liquid.

22. The method of claim 16 wherein said step of adding said compatible carrier liquid further includes adjusting the saturation magnetization of said carrier liquid based magnetic fluid composition to a predetermined value.

23. A method of making an improved magnetic fluid composition from a magnetic fluid comprising a low vapor-pressure carrier liquid containing a plurality of magnetic particles coated with at least one surfactant, said method comprising the steps of:

flocking said magnetic fluid with a solvent compatible with said carrier liquid;

separating said solvent containing carrier liquid from said plurality of surfactant-coated magnetic particles;

re-suspending said plurality of surfactant-coated magnetic particles in a compatible solvent base forming a solvent base mixture;

adding a low molecular weight fluorocarbon-silane surface modifier to improve the acid resistance of said plurality of surfactant-coated magnetic particles wherein said surface modifier is represented by the formulae $$R_{4-n}{}^{1}SiR_{n}{}^{2}$$

or $$R_{3-n}{}^{1}Si_{R_n{}^2}{}^{R^3}$$

wherein $R^1$ denotes a fluoroalkyl radical having one to ten carbon atoms, $R^2$ denotes a hydrolyzable radical chosen from the group consisting of alkoxides of one to three carbon atoms, R3 denotes an alkyl radical having one to three carbon atoms, and n is 1, 2, or 3 on the average;

removing a substantial fraction of said solvent base from said solvent base mixture; and adding a compatible high molecular weight carrier liquid.

24. The method of claim 23 wherein said step of removing said solvent base further includes evaporating said solvent base from said solvent base mixture.

25. The method of claim 24 wherein said evaporating step includes heating said solvent base mixture to a temperature in the range from about 60° C. to about 200° C.

26. The method of claim 25 wherein said evaporating step includes heating said solvent-based magnetic fluid to about 60° C. when said carrier liquid is a hydrocarbon oil-based carrier liquid or an ester oil-based carrier liquid.

27. The method of claim 25 wherein said evaporating step includes heating said solvent-based magnetic fluid to about 200° C. when said carrier liquid is a fluorocarbon oil-based carrier liquid.

28. The method of claim 23 wherein said step of adding said compatible carrier liquid further includes adjusting the saturation magnetization of said carrier liquid based magnetic fluid composition to a predetermined value.

29. The method of claim 23 wherein said $R^1$ further comprises the formula $R^{1a}R^{1b}$ wherein $R^{1a}$ denotes a fluoroalkyl radical having one to eight carbon atoms and $R^{1b}$ denotes an alkyl radical having one to two carbon atoms.

30. A method of making an improved magnetic fluid composition from a magnetic fluid comprising a low molecular weight carrier liquid containing a plurality of magnetic particles coated with at least one surfactant, said method comprising:

mixing an amount of an organic solvent with an amount of said magnetic fluid forming a fluid-solvent mix;

adding a low molecular weight fluorocarbon-silane surface modifier to said fluid-solvent mix forming a treated fluid mix to improve the acid resistance of said plurality of surfactant-coated magnetic particles wherein said surface modifier is represented by the formulae $$R_{4-n}{}^{1}SiR_{n}{}^{2}$$

or $$R_{3-n}{}^{1}Si_{R_n{}^2}{}^{R^3}$$

wherein $R^1$ denotes a fluoroalkyl radical having one to ten carbon atoms, $R^2$ denotes a hydrolyzable radical chosen from the group consisting of alkoxides of one to three carbon atoms, $R^3$ denotes an alkyl radical having one to three carbon atoms, and n is 1, 2, or 3 on the average;

heating said treated fluid mix to temperature; and adding a compatible high molecular weight carrier liquid to said fluid mix while said organic solvent evaporates.

31. The method of claim 30 wherein said step of adding said compatible carrier liquid further includes adjusting said fluid mix to have a predetermined saturation magnetization.

32. The method of claim 30 wherein said $R^1$ further comprises the formula $R^{1a}R^{1b}$ wherein $R^{1a}$ denotes a fluoroalkyl radical having one to eight carbon atoms and $R^{1b}$ denotes an alkyl radical having one to two carbon atoms.

33. A magnetic fluid obtained by the process comprising:

obtaining a solvent-based magnetic fluid having a plurality of magnetic particles coated with at least one surfactant;

adding to said solvent-based magnetic fluid a fluorocarbon-silane surface modifier, said surface modifier being a nondispersant and improving the acid resistance of said magnetic fluid;

removing about half of the solvent from said solvent-based magnetic fluid; and adding a compatible high molecular weight organic carrier liquid to said magnetic fluid.

34. The magnetic fluid of claim 33 wherein said surface modifier is represented by the formulae $$R_{4-n}{}^{1}SiR_{n}{}^{2}$$

or $$R_{3-n}{}^{1}Si_{R_n{}^2}{}^{R^3}$$

wherein $R^1$ denotes a fluoroalkyl radical having one to ten carbon atoms, $R^2$ denotes a hydrolyzable radical chosen from the group consisting of alkoxides of one to three carbon atoms, R3 denotes an alkyl radical having one to three carbon atoms, and n is 1, 2, or 3 on the average.

35. The magnetic fluid of claim 33 wherein said surface modifier is one of a fluoroalkyl alkoxy silane and a fluoroalkyl alkyl alkoxy silane.

36. The magnetic fluid of claim 34 wherein said $R^1$ further comprises the formula $R^{1a}R^{1b}$ wherein $R^{1a}$ denotes a fluoroalkyl radical having one to eight carbon atoms and $R^{1b}$ denotes an alkyl radical having one to two carbon atoms.

37. The magnetic fluid of claim 33 wherein said surface modifier is selected from the group consisting of heptadecafluorodecyltrimethoxysilane, tridecafluorooctyltrimethoxysilane, heptadecafluorodecyltriethoxysilane, tridecafluorooctyltriethoxysilane, trifluoropropyltrimethoxysilane, and trifluoropropylmethyldimethoxysilane.

* * * * *